(12) United States Patent
Subbiah et al.

(10) Patent No.: US 10,750,258 B1
(45) Date of Patent: Aug. 18, 2020

(54) VIRTUAL NODE PORT BASED VIRTUAL FABRIC SUPPORT

(71) Applicant: DELL PRODUCTS L.P., Round Rock, TX (US)

(72) Inventors: Ramesh Kumar Subbiah, Chennai (IN); Vibin Varghese, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/367,156

(22) Filed: Mar. 27, 2019

(51) Int. Cl.
*H04Q 11/00* (2006.01)
*H04B 10/25* (2013.01)
*H04L 29/12* (2006.01)
*H04L 12/931* (2013.01)
*H04L 12/46* (2006.01)

(52) U.S. Cl.
CPC ......... *H04Q 11/0062* (2013.01); *H04B 10/25* (2013.01); *H04L 12/4641* (2013.01); *H04L 49/357* (2013.01); *H04L 61/6022* (2013.01); *H04Q 2011/0086* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,036,229 B2* | 10/2011 | Banerjee | ............... | H04L 49/354 370/397 |
| 8,228,820 B2* | 7/2012 | Gopal Gowda | ........ | H04L 45/12 370/254 |
| 2009/0092141 A1* | 4/2009 | Banerjee | ............... | H04L 49/354 370/397 |
| 2009/0274162 A1* | 11/2009 | Gopal Gowda | ........ | H04L 45/12 370/419 |
| 2011/0064086 A1* | 3/2011 | Xiong | ................... | H04L 49/351 370/401 |
| 2012/0163376 A1* | 6/2012 | Shukla | .................. | H04L 12/413 370/388 |
| 2012/0275301 A1* | 11/2012 | Xiong | ................... | H04L 49/357 370/230 |
| 2013/0163591 A1* | 6/2013 | Shukla | .................. | H04L 49/357 370/355 |
| 2014/0269745 A1* | 9/2014 | Johnson | ................ | H04L 45/745 370/401 |
| 2015/0138956 A1* | 5/2015 | Hathorn | .............. | H04L 41/0668 370/227 |
| 2015/0333967 A1* | 11/2015 | Addanki | ................. | H04L 41/12 370/392 |

* cited by examiner

*Primary Examiner* — Omar S Ismail
(74) *Attorney, Agent, or Firm* — North Weber & Baugh LLP (57) ABSTRACT

Embodiments of the present invention include systems and methods for transmitting data in a fibre channel (FC) network. The system includes a gateway that has: a port at which a plurality of data frames that are transmitted from a plurality of virtual node (VN) ports in a server are received, where data frames from at least two of the plurality of VN ports are related to different virtual fabrics (vfabrics) of a FC network.

20 Claims, 9 Drawing Sheets

| Session MAC | VF-ID VLAN |
|---|---|
| MAC of WWN-1A | VLAN1 |
| MAC of WWN-1B | VLAN2 |
| MAC of WWN-1C | VLAN3 |
| MAC of WWN-2A | VLAN1 |
| MAC of WWN-2B | VLAN1 |
| MAC of WWN-2C | VLAN1 |

VIRTUAL NODE PORT BASED VIRTUAL FABRIC SUPPORT

BACKGROUND

A. Technical Field

The present invention relates to information handling systems, more particularly, to systems and methods for segregating virtual node (VN) ports on a single physical port to different fibre channel (FC) storage fabrics.

B. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the conventional FC network systems, a server communicates data with FC storage devices through multiple virtual fabrics (vfabrics). Typically, multiple applications run on a server that has one or more physical interface ports (or equivalently enodes). In general, each application running on the server logs into a vfabric, using one of the two types of login, fabric login (FLOGI) and fabric discovery (FDISC), and a virtual node (VN) port is created for each login. In the conventional FC network systems, the VN ports that are created by the multiple logins and share the same physical port are connected to the same vfabric.

Since each physical port can support only one virtual fabric (vfabric), the applications that share the same physical port must communicate through the same vfabric. Thus, the server needs to have multiple physical ports to support the applications that communicate through multiple vfabrics. Stated differently, the fabric segregation is allowed on at the physical port level of the server.

In general, the server may be connected to a N-port ID virtualization gateway (NPG) that can support multiple vfabrics. However, due to the above restriction on the fabric segregation, the conventional server needs to have multiple interfaces to leverage the NPG's capability to support multiple vfabrics, where the multiple interfaces result in additional complexity of structure as well as consumption of computational resources of the server. As such, there is a need for a system that allow the server to communicate through multiple vfabrics while the segregation into multiple vfabrics is not performed at the physical port level of the server so that the server can leverage the capability of the NPG that can support multiple vfabrics.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall be noted that: (1) certain steps may optionally be performed; (2) steps may not be limited to the specific order set forth herein; (3) certain steps may be performed in different orders; and (4) certain steps may be done concurrently.

Figure 1:
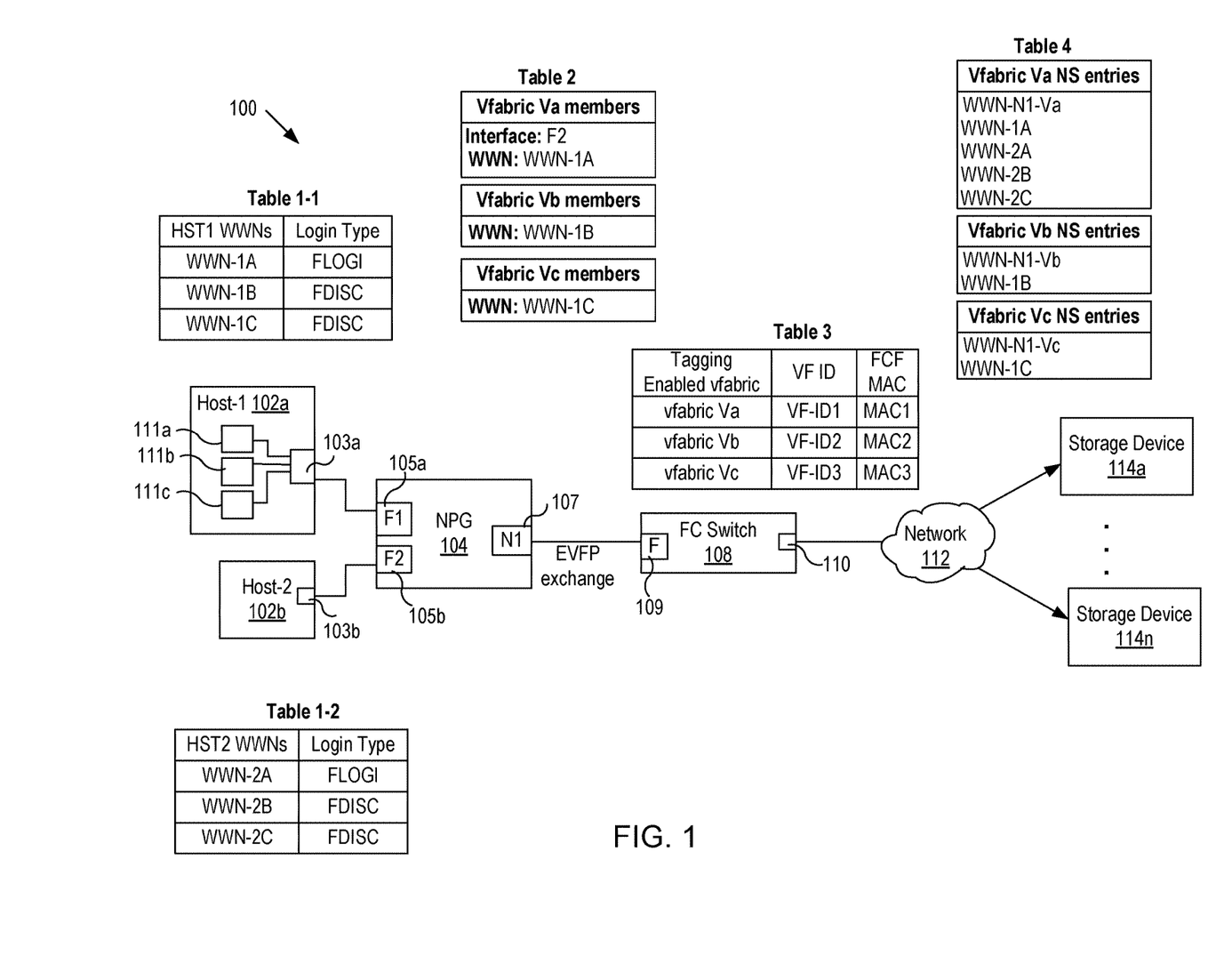
FIG. 1 depicts a schematic diagram of a network supporting multiple vfabrics according to embodiments of the present disclosure.

FIG. 1 shows a schematic diagram of network 100 supporting multiple vfabrics according to embodiments of the present disclosure. Hereinafter, the term vfabric refers to a virtual network topology in which components pass data to each other. As depicted, the network includes: a FC forwarder device, such as an N_port ID virtualization (NPIV) gateway (NPG), 104; host-1 102a and host-2 102b having physical ports 103a and 103b, respectively, and connected to the N_port ID virtualization (NPIV) gateway (NPG) 104 through two physical fabric ports F1 105a and F2 105b, respectively; an FC switch 108 having a first port 109 connected to a proxy node port N1 107 of NPG and a second port 110 connected to the network 112, such as the Internet; and one or more storage devices 114a-114n coupled to the network 112. In embodiments, the storage devices 114a-114n may be directly coupled to the FC switch 108. In embodiments, each of the storage devices 114a-114n may be provided by a FC storage area network (SAN) and configured to receive FC communications originated from the hosts 102a and 102b through the FC switch 108, send FC communications to the hosts through the FC switch, and/or perform other FC storage system functionality that would be apparent to those of ordinary skill in the art. For the purpose of illustration, the NPG 104 is assumed to be the FC forwarder device 104, even though other types of forwarding device may be used in place of NPG.

In embodiments, each host (e.g. 102a) may be a server. For brevity, only two hosts are shown in FIG. 1. However, one of skill in the art in possession of the present disclosure will recognize that any other suitable number of hosts may be connected to the NPG 104. Also, it should be apparent to those of ordinary skill in the art that the host-1 102a (and host-2 102b) may have multiple physical ports, such as converged network adaptors (CNAs) or host bus adaptors (HBAs), that are configured to provide fibre-channel-on-Ethernet (FCoE) communications between the NPG 104 and the hosts 102a and 102b. In embodiments, each physical port of the hosts may be coupled to a physical fabric port of the NPG 104 by a cable (e.g., an optical cable, a copper wire cable, and/or other cabling) and/or other coupling system that would be apparent to those of ordinary skill in the art.

In embodiments, the NPG 104 may be provided by a switch or other networking device that is configured to receive Ethernet communications from the hosts 102a and 102b, convert those Ethernet communications to FC communications for forwarding to the FC switch 108, receive FC communications from the FC switch 108, convert those FC communications to Ethernet communications for forwarding to the hosts 102a and 102b. In addition, as described below, the NPG 104 may allow the VN ports 111a-111c created in the hosts 102a and 102b be segregated into different vfabrics.

For the purpose of illustration, it is assumed that the FC configuration in the system 100 includes only three virtual fabrics (vfabrics) Va, Vb and Vc, even though other suitable number of vfabrics may be supported by the system 100. In embodiments, during the initial handshake stage, the NPG 104 and FC switch 108 may exchange exchange-virtual-fabric-parameters (EVFPs) to each other, and assign a virtual fabric ID (VF ID) to each vfabric of the system 100. Table 3 in the FIG. 1 shows the three vfabrics Va, Vb and Vc and the corresponding identifications (VF IDs). In embodiments, Table 3 may be stored in both NPG 104 and FC switch 108, where NPG and FC switch may use the VF IDs to tag the data frames exchanged between the FC switch 108 and the hosts 102a and 102b, to thereby identify each data frame as part of the corresponding vfabric.

In embodiments, the proxy node port (shortly NP port) N1 107 of NPG 104 may log into each of the vfabrics Va, Vb, and Vc. For instance, the login name of N1 107 for the vfabric Va may be WWN-N1-Va, as shown in Table 4 in FIG. 1. (Here, the term WWN refers to world-wide-name.) In embodiments, this login may be a FLOGI and proxy the subsequent logins (i.e., the logins of WWN-1A, WWN-2A, WWN-2B, and WWN-2C into the vfabric Va, as shown in Table 4 in FIG. 1) from the hosts 102a and 102b, i.e., the subsequent logins of the hosts 102a and 102b into the vfabric Va may depend on the parent login WWN-N1-Va. Similarly, the proxy node port N1 107 of NPG 104 may log into the vfabric Vb, creating a login name WWN-N1-Vb, as shown in Table 4. From the standpoint of the FC switch 108, the N1 107 may be the proxy port of the two hosts 102a and 102b.

In embodiments, after the initial EVFP exchanges between the NPG 104 and FC switch 108, when the N1 107 is logged into each vfabric, the FC switch 108 may send an acceptance response to the NPG 104 and, upon receiving the response, the NPG 104 may create a fibre channel forwarder (FCF) media access control (MAC) address. Table 3 shows the mapping between the VF IDs and FCF MAC addresses (or shortly, FCF MACs).

Figure 2:
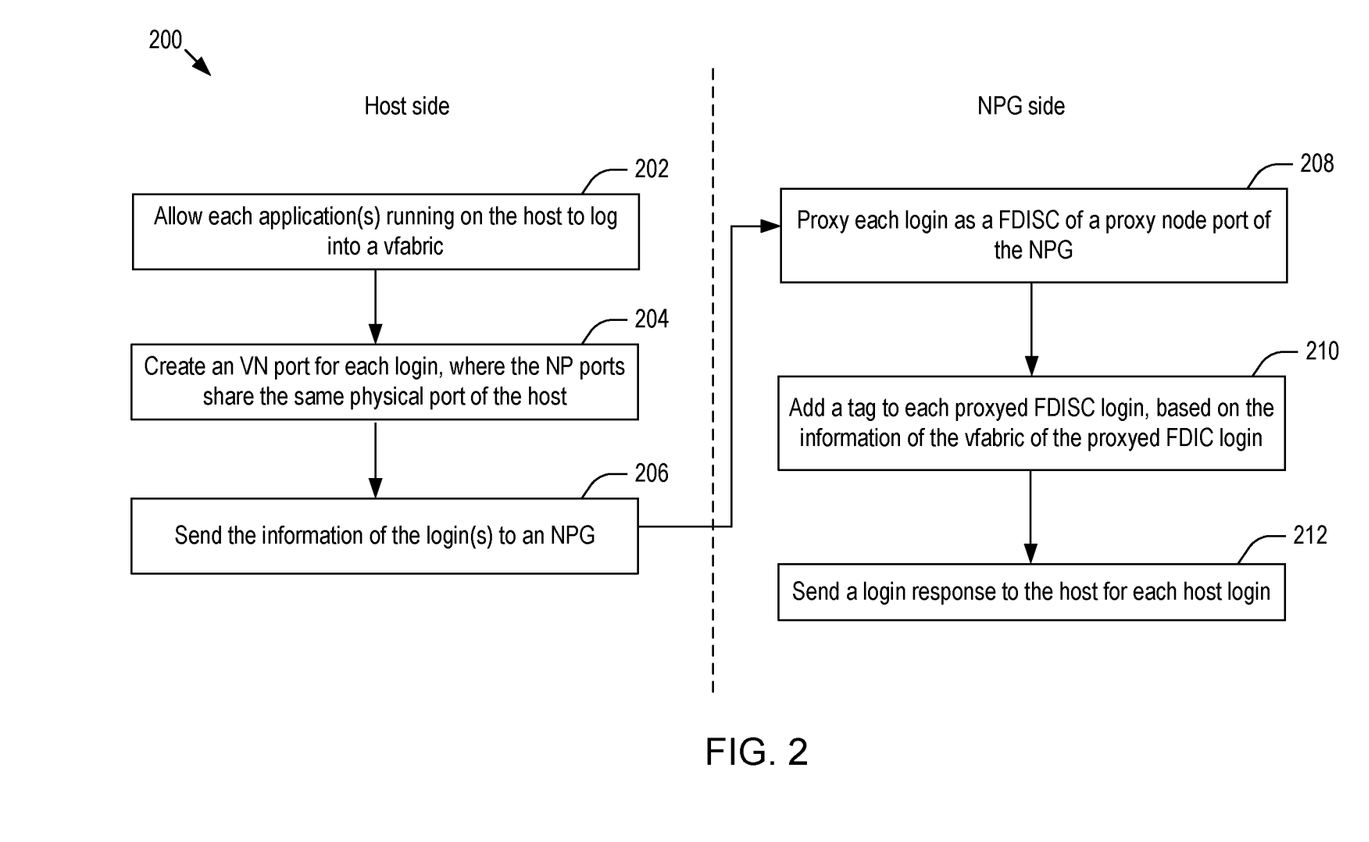
FIG. 2 depicts a flowchart of an illustrative process for handling host logins according to embodiments of the present disclosure.

In embodiments, after the successful creation of FCF MAC address, the applications of the hosts 102a and 102b may log into the vfabrics. FIG. 2 shows a flowchart 200 of an illustrative process for handling host logins according to embodiments of the present disclosure. For the purpose of illustration, it is assumed that three applications running on the host-1 102a may log into the three vfabrics, even though other suitable number of applications may run on the host-1 102a and log into other suitable number of vfabrics. The process 200 starts at step 202. At step 202, each application running on the host-1 102a may attempt to log into a vfabric, and if the WWN of the login matches with anyone of the vfabric list, the login may be allowed and tagged with the VF ID of the vfabric. By way of example, three VN_port logins (or shortly logins), WWN-1A, WWN-1B, and WWN-1C, may correspond to the three vfabrics, Va, Vb, and Vc, respectively, as shown in Table 2 in FIG. 1. In embodiments, as described below, the subsequent traffic from an application may get tagged to the VF ID of the application at the NPG 104.

In embodiments, each login of the applications may create a virtual node (VN) port, i.e., each application may be associated with a VN port and a login name for a vfabric. (As such, hereinafter, the terms application, login, and VN port are used interchangeably.) By way of example, the first login of the host-1 102a may have the login name WWN-1A and be a fabric login (FLOGI), where the subsequent logins may have the login names WWN-1B and WWN-1C and be fabric discoveries (FDISCs), as shown in Table 1-1 in FIG. 1.

In Table 4, each vfabric has a name server list that includes one or more entries. The first entry in each list, such as WWN-N1-Vb, is a FLOGI while the following entries are FDISCS. In embodiments, as discussed above, the WWN-1A of the host-1 102a may log into the vfabric Va as a FLOGI, but NPG 104 may later change the type into FDISC before entering the login WWN-1A into the name server list in Table 4.

At step 204, a VN port (e.g. 111a) may be created for each login. By way of example, there are three logins running on the host-1 102a and, as such, three VN ports 111a-111c may be created, where these VN ports share the same physical port F1 105a. In embodiments, from the standpoint of the NPG 104, WWN-1A may be the parent login of all the logins that share the physical port 103a. As such, in embodiments, the first login, WWN-1A, may be a FLOGI, while the other logins may be FDISCs. It is noted that, unlike the conventional system, the fabric port F1 105a may not be configured for a particular vfabric, i.e., the fabric port F1 105a may not be a part of any vfabric.

In embodiments, Table 1-2 shows the WWNs of the three logins of the host-2 102b and the corresponding login types. For the purpose illustration, only three logins are shown in Table 1-2, even though other suitable number of applications may run and log into vfabrics. In embodiments, the fabric port (interface) F2 105b may be configured for a particular vfabric Va, i.e., the port F2 105b may be a member of the vfabric VA, as shown in Table 2. As a consequence, all of the logins of host-2 102b may belong to the NS entries of the vfabric Va, as shown in Table 4, and tagged to the corresponding VF ID.

In embodiments, from the standpoint of the NPG 104, WWN-2A may be the parent login of all the logins that share the physical port 105a. As such, in embodiments, the first login, WWN-2A, may be a FLOGI, while the other logins may be FDISCs. As discussed in conjunction with WWN-1A, WWN-2A may be a parent login for the port F2 105b of the NPG 104. However, the NPG 104 may later convert WWN-2A from FLOGI to FDICS before entering WWN-2A into the vfabric name server entry in Table 4.

Figure 3:
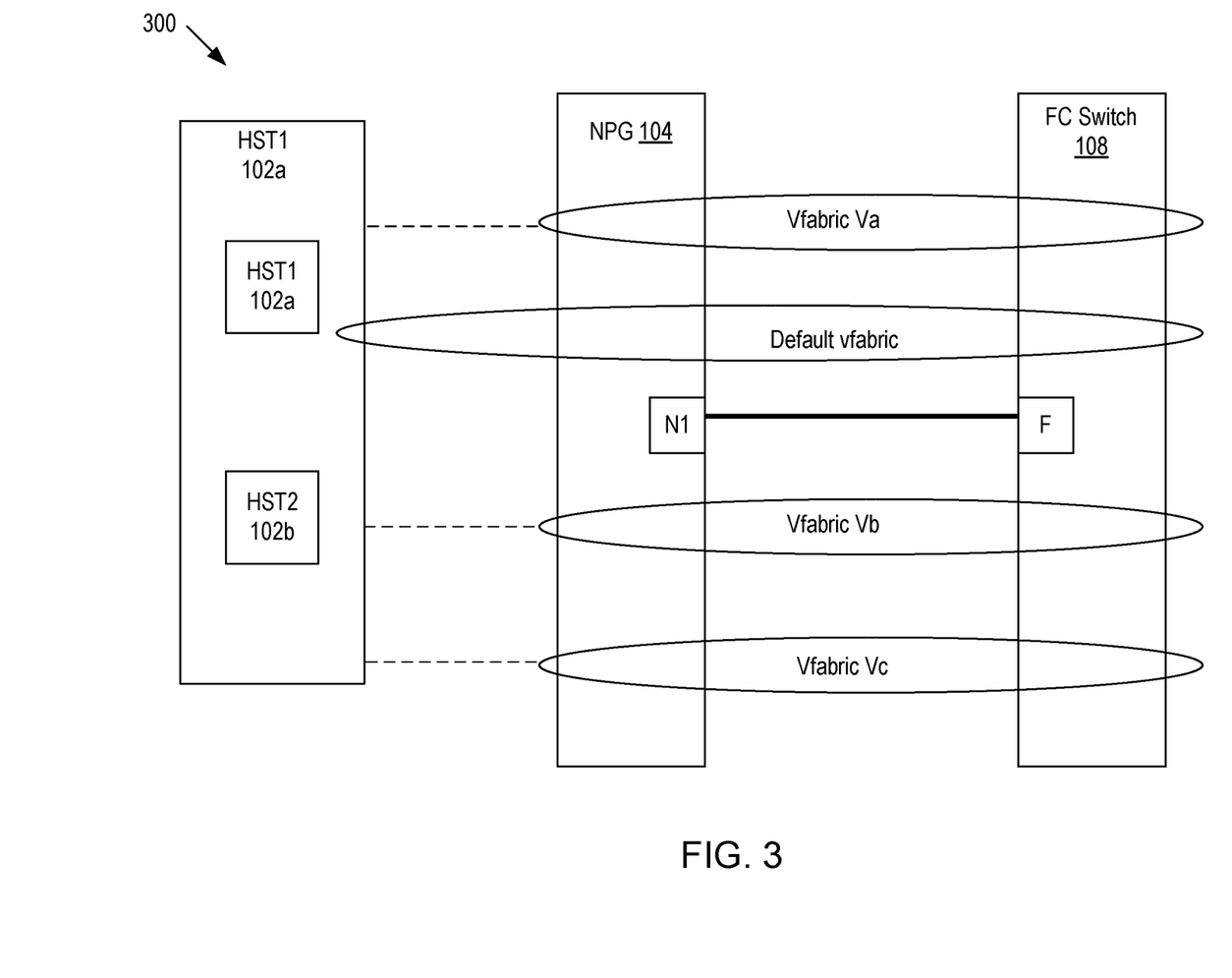
FIG. 3 depicts a diagram of vfabrics in the system of FIG. 1 according to embodiments of the present disclosure.

In embodiments, the system 100 may include a default vfabric, where a VN port(s) that does not belong to anyone of the three vfabrics Va, Vb, and Vc may log into the default fabric. Also, in embodiments, each vfabric may be associated with a virtual local area network (VLAN) so that the each vfabric is segregated within the NPG 104. (Hereinafter, the term VF-ID VLAN refers to the VLAN that corresponds to a vfabric having a VF ID.) FIG. 3 shows a diagram of vfabrics in the system 100 according to embodiments of the present disclosure. As depicted, the hosts 102 and 102b may communicate with the NPG 104 via the default vfabric. More specifically, the hosts 102a and 102b may communicate data to the NPG 104 via the VLAN corresponding to the default vfabric.

Referring back to FIG. 2, the information of the login may be sent to the NPG 106 at step 206. At step 208, the CPU of the NPG 104 may lift up each login from the host-1 102a to proxy the login as a FDISC login of the NP port N1 110. Similarly, the three logins, WWN-2A, WWN-2B, and WWN-2C, of the host-2 102b may be proxied as FDISC logins of the NP port N1 110. In embodiments, the fabric port F2 105b may be configured to a particular vfabric Va, i.e., the fabric port 105b may be a part of the vfabric Va.

In embodiments, Table 4 in FIG. 1 shows the name server entries for each vfabric. In embodiments, Table 4 in FIG. 1 may be maintained in FC switch 108. By way of example, the vfabric Va may include five logins. From the standpoint of the FC switch 108, the first login WWN-N1-Va may be the parent login of the following four logins and be a FLOGI, while the other four logins may be FDISC logins. As discussed above, WWN-1A may be logged in as a FLOGI. However, the NPG 104 may change WWN-1A into a FDISC login since WWN-1A is not a parent login in Table 4. At step 210, for each host login, the NPG 104 may send a login response to the corresponding host, completing the host login process.

Figure 4:
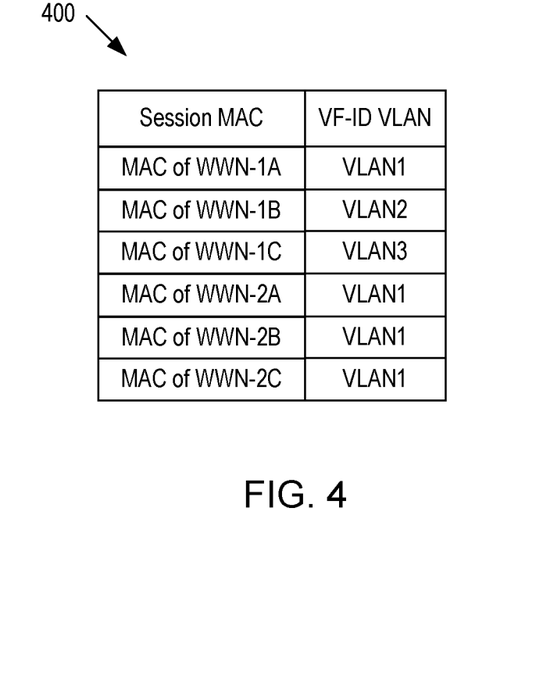
FIG. 4 depicts an exemplary host login database table according to embodiments of the present disclosure.

FIG. 4 shows an exemplary host login database table 400 according to embodiments of the present disclosure. As depicted, the Table 400 may show a mapping between the session MAC address of each host login (in the first column of Table 400) and the VLAN of the corresponding vfabric (in the second column of Table 400). For instance, WWN-1A is a member of vfabric Va. As such, the MAC address of WWN-1A may be mapped to VF-ID1. In embodiments, the Table 400 may be created and/or updated after a host login is completed.

In embodiments, in the NPG 104, each vfabric may be created with members being either WWNs or interfaces. For instance, WWN-1A, WWN-1B and WWN-1C may be members of the vfabrics Va, Vb, and Vc, respectively, as shown in Table 2 in FIG. 1. It is noted that the fabric port F1 105a may not be configured for a particular vfabric. As such, unlike the conventional system, the data communicated through the physical port (interface) 103a may belong to multiple vfabrics. Stated differently, the three VN ports 111a-111c created by the three logins of the host-1 102a may share the common physical port 103a, while the VN ports (and the logins) may be parts of different vfabrics.

In conventional systems that provide a first virtual machine on the server device that logs in to a first virtual fabric and a second virtual machine on the server device that logs in to a second virtual fabric, that server device is required to have two converged network adapters (CNAs) or two host bus adapters (HBAs), as each adapter is only capable of logging in to one fabric at a time. As such, if there is only one CNA/HBA, the first virtual machine and the second virtual machine may only operate via the one fabric to which the CNA/HBA is logged in. Thus, to communicate with multiple virtual fabrics, conventional server devices require an adapter for each virtual fabric, which can lead to under-utilization of bandwidth on the adapters and excess hardware, particularly when the traffic routed between the virtual machines and their separate virtual fabrics via the separate adapters could be handled by fewer adapters.

Unlike the conventional systems, the NPG 104 may allow the segregation of three VN ports 111a-111c (WWN-1A, WWN-1B and WWN-1C) into multiple vfabrics (Va, Vb, and Vc), where the three applications (and their VN ports) share the common physical port 105a. Stated differently, unlike the conventional systems, the fabric port 105a may not be configured for a particular vfabric, which supports a flexible deployment where different applications (and VN ports) running on the host-1 102a may be segregated into different vfabrics on the single physical port 105a.

Figure 5:
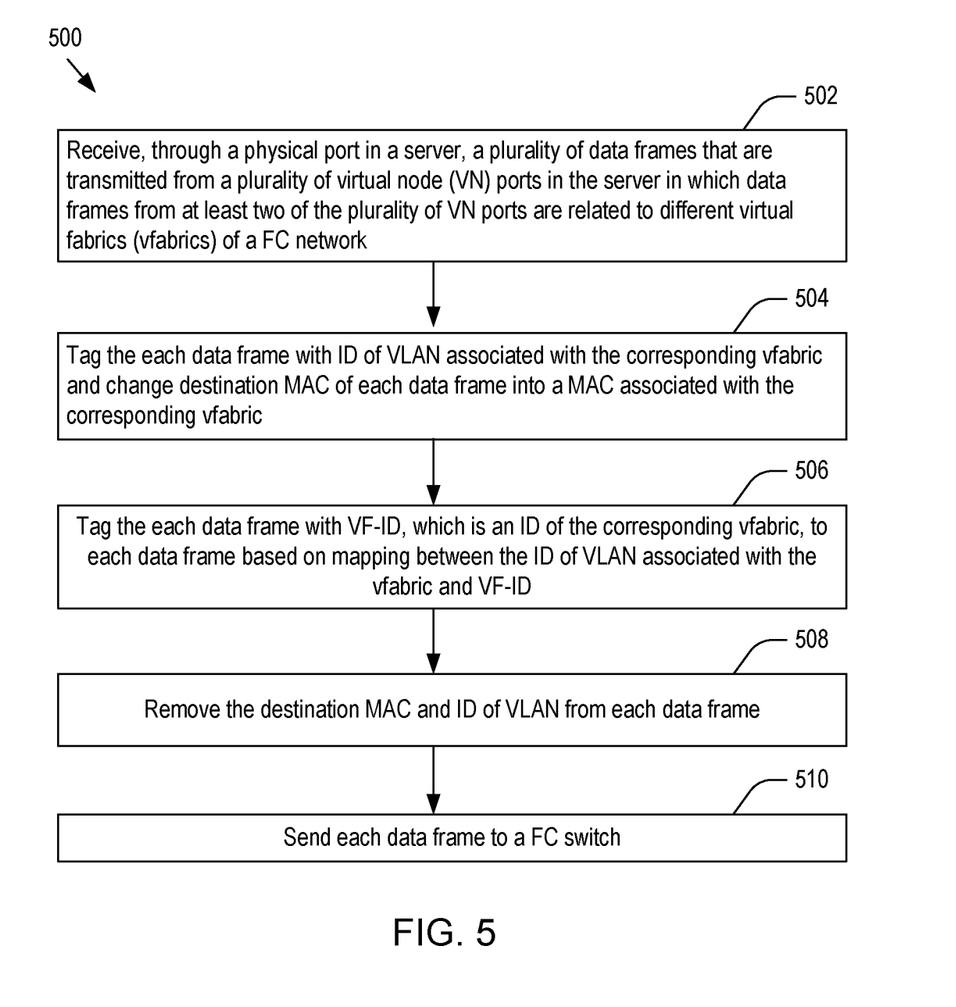
FIG. 5 depicts a flowchart of an illustrative process for handling data traffic from a host to a FC switch according to embodiments of the present disclosure.

Upon completion of the host login, the system 100 may be used to handle data traffic between the storage devices 114a-114n and the hosts 102a and 102b. FIG. 5 shows a flowchart of an illustrative process 500 for handling data traffic from a host to a FC switch according to embodiments of the present disclosure. As depicted, the process 500 starts at step 502. At step 502, the NPG 104 may receive a plurality of data frames from the host-1 102a (server) through the physical port 103a, wherein the plurality of data frames are transmitted through first and second vfabrics. In embodiment, a plurality of data frames may be transmitted from a plurality of virtual node (VN) ports 111a-111c in the host-1 102a, where data frames from at least two of the plurality of VN ports are related to different virtual fabrics (vfabrics) of a FC network.

Figure 7:
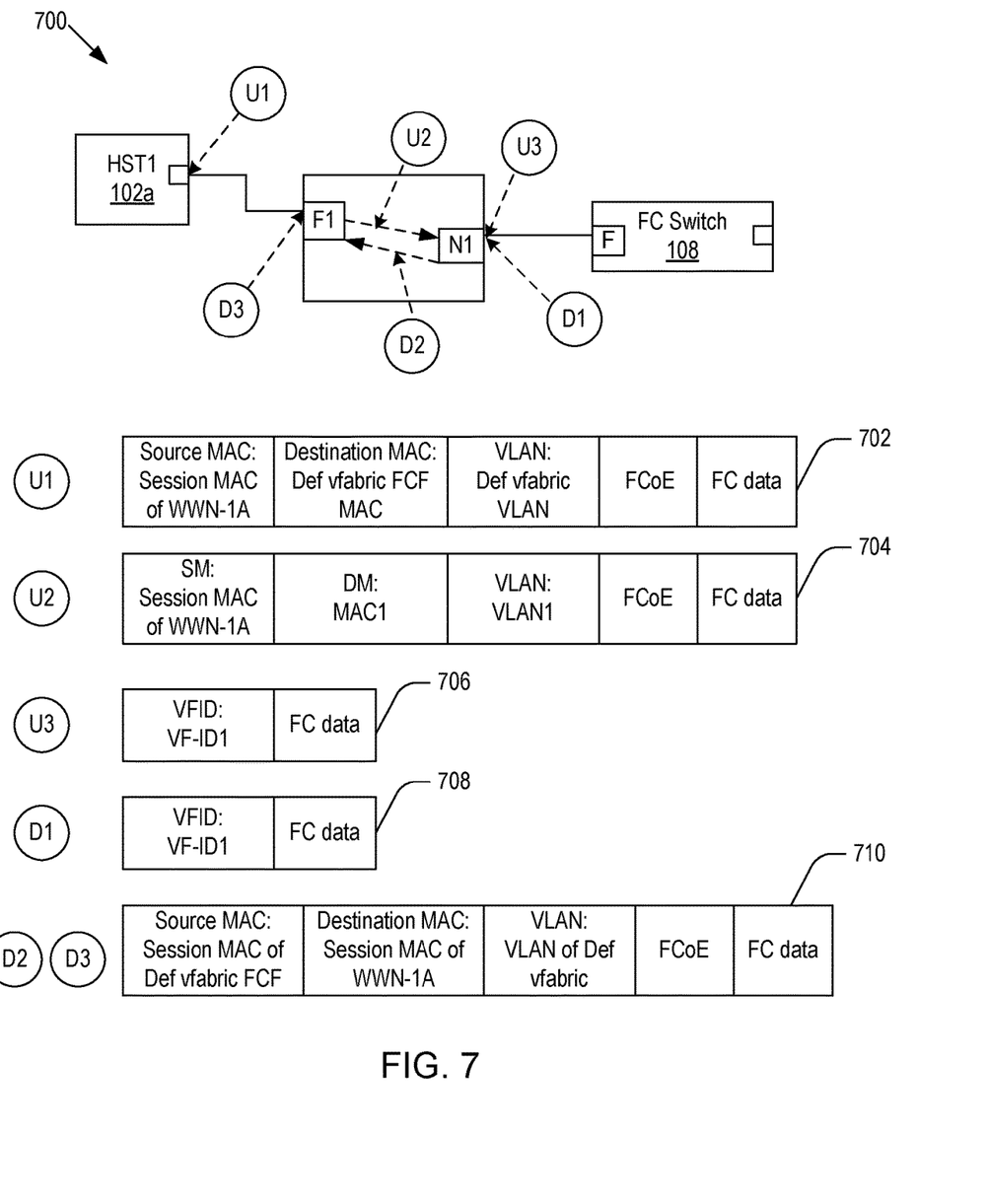
FIG. 7 shows a schematic diagram of exemplary data frames exchanged between a server and an FC switch according to embodiments of the present disclosure.

FIG. 7 shows schematic diagrams of exemplary data frames exchanged between the host-1 102a (e.g. the host login WWN-1A) and FC switch 108 according to embodiments of the present disclosure. For the purpose of illustration, FIG. 7 shows the changes in a data frame as the data frame is transmitted from the host-1 102a to FC switch 108 (or vice versa), where WWN-1A may be logged into the vfabric Va to be a member of vfabric Va. As depicted, the host-1 102a may send a data frame 702 that may include five data fields: source MAC, destination MAC, VLAN, FCoE header, and FC payload data. In the data frame 702, the source MAC may be the session MAC address of WWN-1A, the destination MAC may be the FCF MAC address of the default vfabric, VLAN may be the ID of the VLAN corresponding to the default vfabric.

Referring back to FIG. 5, at step 504, the NPG 106 may change each data frame. In embodiments, for each data frame, the NPG 104 may determine the ID of the VLAN associated with the corresponding vfabric Va (shortly, VF-ID VLAN) and tag each data with the VF-ID VLAN. In embodiments, the VF-ID VLAN may be determined using the host login database table 400. In embodiments, the VLAN field of the data frame 702 may be changed from the ID of the VLAN associated with the default vfabric to the ID of the VLAN associated with the vfabric Va. In embodiments, the destination MAC may be changed from the FCF MAC address of the default vfabric to the FCF MAC address of the corresponding vfabric Va. The data frame 704 in FIG. 7 shows the data frame changed at step 504.

At step 506, the NPG 104 may tag each data frame with VF-ID based on the mapping between the VF-ID of the vfabric Va and the ID of VLAN associated with the vfabric Va (shortly, VF-ID), where VF-ID is the identification of the vfabric Va. In embodiments, the mapping may be performed by a FC physical (PHY) chip (not shown in the drawings) included in the NPG 104. At step 508, the source MAC, destination MAC and the ID of VLAN may be removed from the data frame, where the data frame 706 in FIG. 7 is the changed data frame. At step 510, the data frame is sent to the FC switch 108 through the port N1 107.

Figure 6:
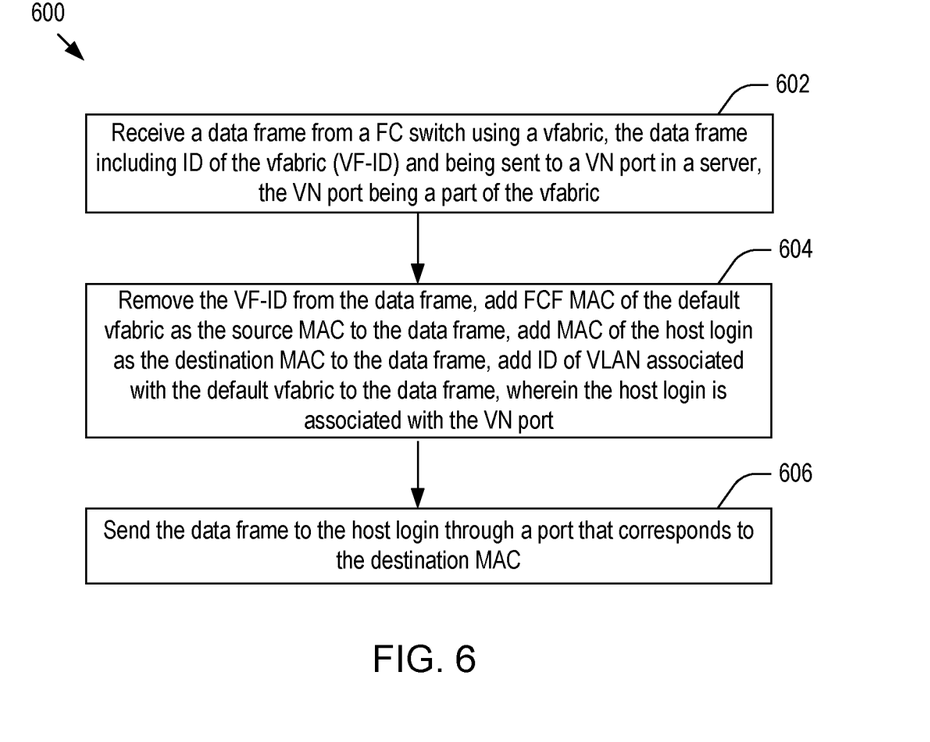
FIG. 6 depicts a flowchart of an illustrative process for handling data traffic from a FC switch to a host according to embodiments of the present disclosure.

FIG. 6 shows a flowchart 600 of an illustrative process for handling data traffic from the FC switch 108 to the host-1 102a (more specifically, the host login WWN-1A) according to embodiments of the present disclosure. At step 602, the NPG 104 may receive a data frame 708 from the FC switch 108 using the vfabric Va, where the data frame may include the ID of the vfabric Va and FC payload and may be sent to a VN port 111a. In embodiments, the VN port 111a may a member of the vfabric Va. As shown in the data frame 708, the VF ID may be VF-ID1 since the data traffic is transmitted through the vfabric Va and the VF-ID of the vfabric Va is VF-ID1.

At step 604, the NPF 104 may remove the VF-ID from the data frame 708 and add Source MAC, destination MAC, and VLAN to the data frame 708. The data frame 710 in FIG. 7 shows the changed data frame. As depicted in FIG. 7, the source MAC may be the FCF MAC address of the default vfabric, the destination MAC address may be the MAC address of WWW-1A, and ID of the VLAN may be the ID of the VLAN associated with the default vfabric. At step 606, the data frame 710 may be sent to the host-1 102a (more specifically WWN-1A) to the physical port 103a, where the physical port 103a is shared by the VN ports 111a-111c and the data frame 710 may be sent to the corresponding application through the VN port 111a.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 8:
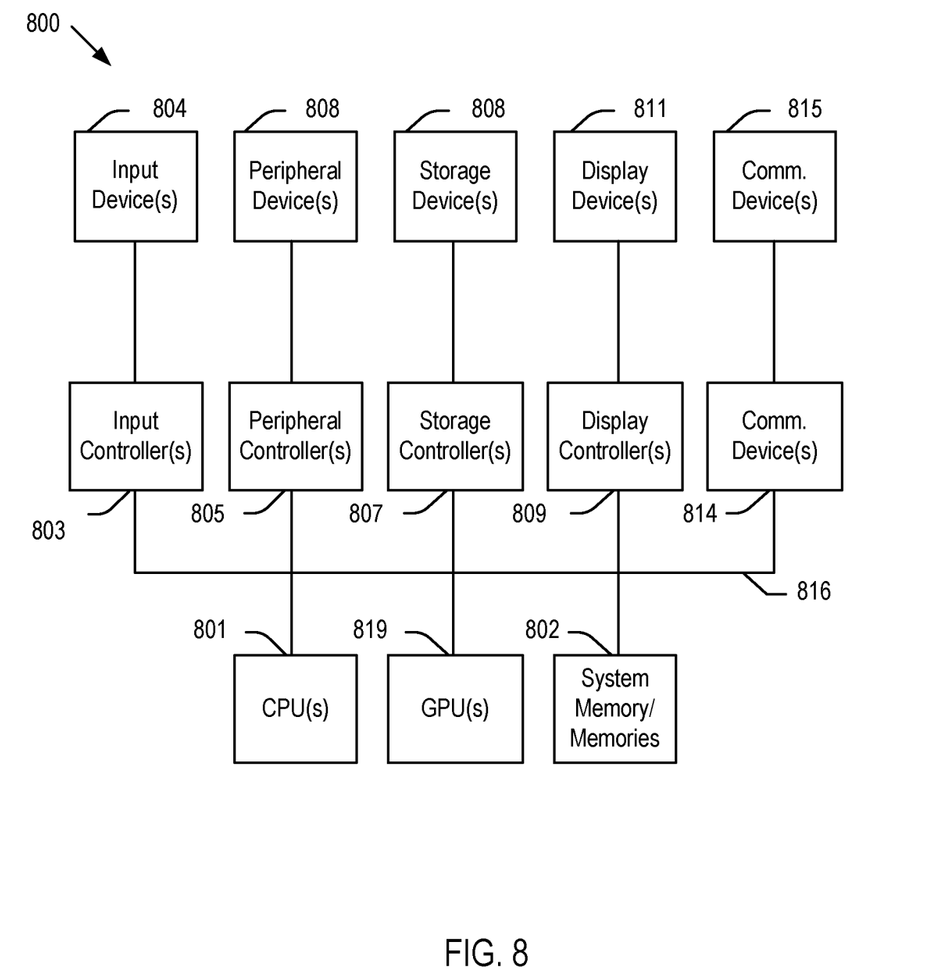
FIG. 8 depicts a simplified block diagram of an information handling system according to embodiments of the present invention.

FIG. 8 depicts a simplified block diagram of an information handling system (or computing system) according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more central processing units (CPU) 801 that provides computing resources and controls the computer. CPU 801 may be implemented with a microprocessor or the like, and may also include one or more graphics processing units (GPU) 819 and/or a floating-point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, touchscreen, and/or stylus. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT), a thin film transistor (TFT) display, organic light-emitting diode, electroluminescent panel, plasma panel, or other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 9:
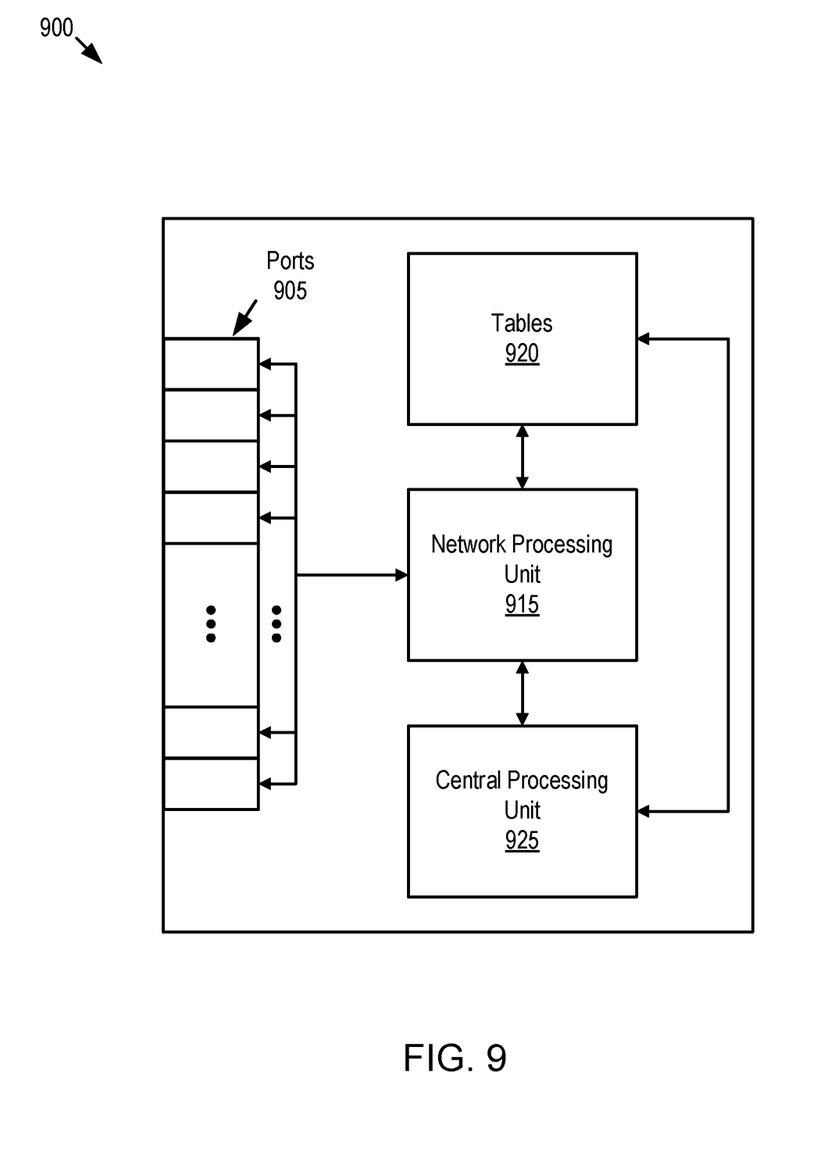
FIG. 9 depicts an alternative block diagram of an information handling system, according to embodiments of the present disclosure.

FIG. 9 depicts an alternative block diagram of an information handling system, according to embodiments of the present disclosure. It will be understood that the functionalities shown for system 900 may operate to support various embodiments of the present disclosure—although it shall be understood that such system may be differently configured and include different components (including fewer or more components).

The information handling system 900 may include a plurality of I/O ports 905, a network processing unit (NPU) 915, one or more tables 920, and a central processing unit (CPU) 925. The system includes a power supply (not shown) and may also include other components, which are not shown for sake of simplicity.

In one or more embodiments, the I/O ports 905 may be connected via one or more cables to one or more other network devices or clients. The network processing unit 915 may use information included in the network data received at the node 900, as well as information stored in the tables 920, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combination.

What is claimed is:

1. An information handling system for transmitting data in a fibre channel (FC) network, comprising:
   a plurality of ports;
   one or more processing units communicatively coupled to the plurality of ports; and
   a non-transitory computer-readable medium or media comprising one or more sequences of instructions which, when executed by at least one of the one or more processors, causes steps to be performed comprising:
      receiving, via a physical port of a server, a plurality of data frames that are transmitted from a plurality of virtual node (VN) ports at the server in which data frames from at least two of the plurality of VN ports are associated with different virtual fabrics (vfabrics) of a FC network;
      using one or more tables to tag each data frame of the plurality of data frames with one or more identifiers to facilitate routing of the data frame via the vfabric of the FC network which the VN port that originated the data frame is associated with; and
      sending the plurality of tagged data frames to a FC switch.

2. An information handling system as recited in claim 1, wherein the step of using one or more tables to tag each data frame of the plurality of data frames with one or more identifiers to facilitate routing of the data frame via the vfabric of the FC network which the VN port that originated the data frame is associated with comprises:
      tagging each of the plurality of data frames with an identification (ID) of a virtual local area network (VLAN) that is associated with a corresponding one of the plurality of vfabrics.

3. An information handling system as recited in claim 2, wherein each of the plurality of data frames includes a fibre channel forwarder media access control (FCF MAC) address of a default vfabric as a destination MAC address and wherein the non-transitory computer-readable medium or media further comprises one or more sequences of instructions which, when executed by at least one of the one or more processors, causes steps to be performed comprising:
      changing the destination MAC address to a MAC address of a corresponding one of the plurality of vfabrics.

4. An information handling system as recited in claim 3, wherein the non-transitory computer-readable medium or media further comprises one or more sequences of instructions which, when executed by at least one of the one or more processors, causes steps to be performed comprising:
      tagging each of the plurality of data frames with an identification of a corresponding one of the plurality of vfabrics.

5. An information handling system as recited in claim 4, the non-transitory computer-readable medium or media further comprises one or more sequences of instructions which, when executed by at least one of the one or more processors, causes steps to be performed comprising:
      removing, from each of the plurality of data frames, the destination MAC address and the ID of the VLAN associated with a corresponding one of the plurality of vfabrics.

6. An information handling system as recited in claim 1, wherein one of the plurality of ports is configured to receive a data frame from the FC switch and wherein the received data frame includes an identification (ID) of a vfabric through which the received data frame is to be transmitted to a VN port in the server and wherein the VN port is associated with the vfabric.

7. An information handling system as recited in claim 6, wherein the non-transitory computer-readable medium or media further comprises one or more sequences of instructions which, when executed by at least one of the one or more processors, causes steps to be performed comprising:
      adding, to the received data frame, a media access control (MAC) address of a host login in the server as a destination MAC address and wherein the host login is associated with the VN port.

8. A computer-implemented method of transmitting data in a fibre channel (FC) network, comprising:
   receiving, via a physical port of a server, a plurality of data frames that are transmitted from a plurality of virtual node (VN) ports at the server in which data frames from at least two of the plurality of VN ports are associated with different virtual fabrics (vfabrics) of a FC network;
   using one or more tables to tag each data frame of the plurality of data frames with one or more identifiers to facilitate routing of the data frame via the vfabric of the FC network which the VN port that originated the data frame is associated with; and
   sending the plurality of tagged data frames to a FC switch.

9. A computer-implemented method as recited in claim 8, wherein the step of using one or more tables to tag each data frame of the plurality of data frames with one or more identifiers to facilitate routing of the data frame via the vfabric of the FC network which the VN port that originated the data frame is associated with comprises:
      tagging each of the plurality of data frames with an identification (ID) of a virtual local area network (VLAN) that is associated with a corresponding one of the plurality of vfabrics.

10. A computer-implemented method as recited in claim 9, wherein each of the plurality of data frames includes a fibre channel forwarder media access control (FCF MAC) address of a default vfabric as a destination MAC address, the method further comprising:
      changing the destination MAC address to a MAC address of a corresponding one of the plurality of vfabrics.

11. A computer-implemented method as recited in claim 10, further comprising:
      tagging each of the plurality of data frames with an identification (VFID) of a corresponding one of the plurality of vfabrics.

12. A computer-implemented method as recited in claim 11, further comprising:
  removing, from each of the plurality of data frames, the destination MAC address and the ID of the VLAN associated with a corresponding one of the plurality of vfabrics.

13. A computer-implemented method as recited in claim 8, further comprising:
  receiving a data frame from the FC switch,
  wherein the received data frame includes an identification (ID) of a vfabric through which the received data frame is to be transmitted to a VN port in the server and wherein the VN port is associated with the vfabric.

14. A computer-implemented method as recited in claim 13, further comprising:
  adding, to the received data frame, a media access control (MAC) address of a host login in the server as a destination MAC address, wherein the host login is associated with the VN port.

15. A non-transient computer-readable medium or media comprising one or more sequences of instructions which, when executed by one or more processors, causes steps to be performed comprising:
  receiving, via a physical port of a server, a plurality of data frames that are transmitted from a plurality of virtual node (VN) ports at the server in which data frames from at least two of the plurality of VN ports associated with different virtual fabrics (vfabrics) of a FC network;
  using one or more tables to tag each data frame of the plurality of data frames with one or more identifiers to facilitate routing of the data frame via the vfabric of the FC network which the VN port that originated the data frame is associated with; and
  sending the plurality of tagged data frames to a FC switch.

16. A non-transient computer-readable medium or media as recited in claim 15, wherein the step of using one or more tables to tag each data frame of the plurality of data frames with one or more identifiers to facilitate routing of the data frame via the vfabric of the FC network which the VN port that originated the data frame is associated with comprises:
  tagging each of the plurality of data frames with an identification (ID) of a virtual local area network (VLAN) that is associated with a corresponding one of the plurality of vfabrics.

17. A non-transient computer-readable medium or media as recited in claim 16, wherein each of the plurality of data frames includes a fibre channel forwarder media access control (FCF MAC) address of a default vfabric as a destination MAC address, the non-transient computer-readable medium or media further comprising one or more sequences of instructions, when executed by the one or more processors, causes steps to be performed comprising:
  changing the destination MAC address to a MAC address of a corresponding one of the plurality of vfabrics.

18. A non-transient computer-readable medium or media as recited in claim 17 further comprising one or more sequences of instructions, when executed by the one or more processors, causes steps to be performed comprising:
  tagging each of the plurality of data frames with an identification of a corresponding one of the plurality of vfabrics.

19. A non-transient computer-readable medium or media as recited in claim 16 further comprising one or more sequences of instructions, when executed by the one or more processors, causes steps to be performed comprising:
  removing, from each of the plurality of data frames, the destination MAC address and the ID of the VLAN associated with a corresponding one of the plurality of vfabrics.

20. A non-transient computer-readable medium or media as recited in claim 15 further comprising one or more sequences of instructions, when executed by the one or more processors, causes steps to be performed comprising:
  receiving a data frame from the FC switch through a port, wherein the received data frame includes an identification (ID) of a vfabric through which the received data frame is to be transmitted to a VN port in the server and wherein the VN port is associated with the vfabric.

* * * * *